Patented Dec. 11, 1945

2,390,734

UNITED STATES PATENT OFFICE 2,390,734

DISULPHANILYLGUANIDINE AND PROCESS OF PREPARING SAME

Alan E. Pierce, Bound Brook, N. J., assignor to American Cyanamid Company, New York, N. Y., a corporation of Maine No Drawing. Application May 17, 1944, Serial No. 536,021

4 Claims. (Cl. 260—397.7)

This invention relates to a new organic compound, disulphanilylguanidine, and to a process of preparing the same.

I have discovered that disulphanilylguanidine, a new organic compound useful as in intermediate in the production of dyes, resins, and other organic compounds, may be prepared by reacting two or more moles of a para-substituted benzenesulphonylhalide with guanidine under conditions more fully described hereinafter.

Disulphanilylguanidine may be prepared in accordance with my process by mixing at least one mole of guanidine, or a guanidine salt, in a water-miscible organic solvent with an alkali metal hydroxide and adding thereto at least two moles of a para-substituted benzenesulphonylhalide and allowing the mixture to react at temperatures not in excess of about 50° C. The product of this reaction is then suitably treated to obtain disulphanilylguanidine.

Various para-substituted benzenesulphanilylhalides may be employed in accordance with the present invention to produce disulphanilylguanidine. The halide group is preferably a chloro radical, but may be a bromo or fluoro radical if desired. The substituent on the para-position should be one that is easily converted into an amino group. Acylamino radicals, such as acetylamino, are readily hydrolyzed to amino groups after the para-substituted benzenesulphonylhalide is reacted with guanidine. Nitro substituents at the para-position may be readily reduced to amino radicals. Still other groups at the para-position, such as diazo, etc., may also be converted into amino radicals if desired. However, we prefer to use those benzenesulphonylhalides having para-substituents which are either hydrolyzed or reduced to amino groups.

My new process will now be described in greater detail by means of the following specific examples. All parts are by weight unless otherwise specified.

Example 1

To a stirred slurry of 126 parts of 97% guanidine nitrate in 940 parts of 95% acetone was added 240 parts of flake sodium hydroxide in portions of 100, 80, and 60 parts, followed by and alternating with three portions of 185 parts each of acetylsulphanilylchloride. The temperature was maintained between 25° C. and 30° C. during the reaction.

The charge was made nearly neutral (pH 8) by the addition of hydrochloric acid and distilled with steam until acetone was completely removed. The slurry was filtered hot and the filtrate chilled. Sodium bis-(acetylsulphanilyl) - guanidine precipitated and was filtered off. Acetylsulphanilylchloride was used in the above reaction because of its availability and cheapness, but acetylsulphanilylbromide and other acylsulphanilylhalides may be used with success.

650 parts of bis-(acetylsulphanilyl)-guanidine was dissolved in a hot solution of 280 parts of flake caustic in 5000 parts of water. The solution was boiled for three hours and then chilled. The sodium salt of disulphanilylguanidine which precipitated was filtered off and recrystallized from water. The salt was then dissolved in hot water, and the solution made acid (pH 4) with hydrochloric acid. Disulphanilylguanidine was precipitated, filtered off, washed, and dried.

Example 2

To a slurry of 28.4 parts of 97% guanidine nitrate in 180 parts of 95% acetone, was added 48 parts of flake sodium hydroxide in portions of 20, 14, and 14 parts each, followed by and alternating with three portions of 28.5 parts each of p-nitrobenzenesulphonylchloride. The temperature was maintained between 25° C. and 30° C. during the reaction. The charge was allowed to stir at 25° C. for one-half hour after the addition of the p-nitrobenzenesulphonylchloride and then it was diluted to about 3000 parts with water. A bright orange precipitate appeared and was filtered off. Sodium bis-(p-nitrobenzenesulphonyl)-guanidine was extracted from the orange precipitate with hot dilute sodium hydroxide solution. Bis-(p-nitrobenzenesulphonyl)-guanidine was precipitated from the alkaline extract by acidifying to pH 4. It was further purified by dissolving in alkaline solution, treatment with activated charcoal and reprecipitation. It decomposed at 265–269° C.

A slurry of 250 parts of water, 100 parts of iron powder, and 2 parts of concentrated hydrochloric acid was heated to 95° C. 10 parts of bis-(p-nitrobenzenesulphonyl)-guanidine was added slowly, keeping the temperature between 95° C. and 100° C. The mixture was stirred at 95° C. for one-half hour after the addition of the nitro compound. The charge was made alkaline with soda ash (pH 9) and the iron sludge removed by filtration. Acidification of the filtrate (pH 4.5) precipitated disulphanilylguanidine, which was removed by filtration.

Although guanidine nitrate is employed as starting material in the above example, it will be understood that any other guanidine salt, such as guanidine carbonate, guanidine sulphate, etc., may be employed. An amount of alkali metal hydroxide is used sufficient to convert the guanidine salt to guanidine and to neutralize the halide acid formed as a result of the reaction between the para - substituted benzenesulphonylhalide and guanidine. Three or more, preferable about 5–6, moles of alkali are used for each mole of guanidine salt. Of course, guanidine itself could be used directly and, in fact, is the actual reactant involved, but because of the instability of free guanidine, it is preferable to use the more stable and easily handled guanidine salt. When free guanidine is employed, the amount of alkali may be reduced.

As stated above, the reaction between the para-substituted benzenesulphonylhalide and guanidine is conducted in a water-miscible, organic solvent. Acetone is preferred, but other solvents may be employed.

The small amount of water normally present in the caustic alkali is ordinarily sufficient to bring about the reaction. In fact, the amount of water in the reaction mixture should be kept as small as possible to avoid hydrolysis of the para-substituted benzenesulphonylhalide to the corresponding sulphonic acid. Also, to avoid undue hydrolysis of the benzenesulphonylhalide the temperature of the reaction mixture during the preparation of bis-(para-substituted benzenesulphonyl)-guanidine should not be allowed to rise above about 50° C. for an extended period of time. Usually, the temperature is maintained at about 25–30° C., but may be as low as 10° C.

I claim:

1. The compound, disulphanilylguanidine having the following formula:

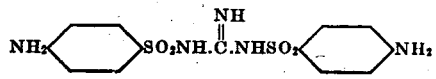

2. The process of producing disulphanilylguanidine which comprises mixing together in a water-miscible organic solvent one mole of guanidine, at least two moles of an alkali metal hydroxide, and at least two moles of a para-acylsulphanilylhalide at a temperature not in excess of about 50° C. and thereafter hydrolyzing the resulting bis-(p-acylsulphanilyl)-guanidine to remove the acyl groups thereby forming disulphanilylguandine.

3. The process of producing disulphanilylguanidine which comprises mixing together in a water-miscible organic solvent one mole of guanidine, at least two moles of an alkali metal hydroxide, and at least two moles of a p-acetylsulphanilylchloride at a temperature not in excess of about 50° C. and thereafter hydrolyzing the resulting bis-(p-acetylsulphanilyl)-guanidine to remove the acetyl groups thereby forming disulphanilylguandine.

4. The process of producing disulphanilylguanidine which comprises mixing together in acetone one mole of a guanidine salt, at least three moles of sodium hydroxide, and at least two moles of p-acetylsulphanilylchloride at a temperature of about 25–30° C. and thereafter heating the resulting bis-(p-acetylsulphanilyl)-guanidine in an aqueous alkaline solution to remove the acetyl groups thereby forming disulphanilylguanidine.

ALAN E. PIERCE.